United States Patent
Roy et al.

(10) Patent No.: US 11,617,165 B2
(45) Date of Patent: Mar. 28, 2023

(54) METHODS AND SYSTEMS FOR RECOVERING DANGLING DATA IN A NR LEG OF A SPLIT BEARER

(71) Applicant: Samsung Electronics Co., Ltd., Suwon-si (KR)

(72) Inventors: Koustav Roy, Bangalore (IN); Arijit Sen, Bangalore (IN); Shouvik Guha, Bangalore (IN); Rishav Agarwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 17/073,103

(22) Filed: Oct. 16, 2020

(65) Prior Publication Data

US 2021/0120543 A1    Apr. 22, 2021

(30) Foreign Application Priority Data

Oct. 17, 2019  (IN) .............................. 201941042176
Oct. 5, 2020   (IN) .............................. 201941042176

(51) Int. Cl.
| | | |
|---|---|---|
| H04W 72/04 | (2009.01) | |
| H04W 76/15 | (2018.01) | |
| H04L 1/00 | (2006.01) | |
| H04W 80/02 | (2009.01) | |
| H04W 24/08 | (2009.01) | |
| H04W 28/02 | (2009.01) | |

(52) U.S. Cl.
CPC ....... *H04W 72/0413* (2013.01); *H04L 1/0003* (2013.01); *H04W 24/08* (2013.01); *H04W 28/0278* (2013.01); *H04W 76/15* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 11,425,770 B1 * | 8/2022 | Marupaduga | H04W 24/02 |
| 2015/0189600 A1 * | 7/2015 | Choi | H04W 52/365 |
| | | | 455/522 |
| 2018/0103402 A1 * | 4/2018 | Susitaival | H04W 72/0413 |
| 2018/0212694 A1 * | 7/2018 | Jheng | H04W 76/20 |

(Continued)

OTHER PUBLICATIONS

3GPP TS 38.321 V15.10.0 (Sep. 2020), Technical Specification, 3rd Generation Partnership Project; Technical Specification Group Radio Access Network; NR; Medium Access Control (MAC) protocol specification (Release 15), 79 pages.

(Continued)

*Primary Examiner* — Edan Orgad
*Assistant Examiner* — Emmanuel K Maglo

(57) ABSTRACT

A method for handling data, dangling in a new radio (NR) leg of a split bearer, by a user equipment (UE) is disclosed. The method comprises predicting occurrence of NR uplink (UL) leg switch; sending a buffer status report (BSR) pertaining to protocol data units (PDUs) in radio link control (RLC) layer and media access control (MAC) layer in the NR leg based on predicting the occurrence of NR UL leg switch; and initiating recovery of dangling PDUs in the NR leg after the occurrence of the NR UL leg switch, wherein the recovery includes sending the dangling PDUs to a long term evolution (LTE) leg of the split bearer.

18 Claims, 7 Drawing Sheets

(56) References Cited

U.S. PATENT DOCUMENTS

| | | | | |
|---|---|---|---|---|
| 2018/0227103 | A1* | 8/2018 | Wang | H04L 5/0055 |
| 2018/0279150 | A1* | 9/2018 | He | H04W 72/1284 |
| 2018/0309660 | A1* | 10/2018 | Loehr | H04L 45/24 |
| 2018/0310202 | A1* | 10/2018 | Löhr | H04W 28/065 |
| 2019/0132771 | A1* | 5/2019 | Jheng | H04W 28/085 |
| 2020/0015302 | A1* | 1/2020 | Shikari | H04W 28/06 |
| 2020/0119883 | A1* | 4/2020 | Skarve | H04L 5/0032 |
| 2020/0236693 | A1* | 7/2020 | Xing | H04W 24/08 |
| 2021/0126753 | A1* | 4/2021 | Mochizuki | H04W 72/085 |
| 2021/0136645 | A1* | 5/2021 | Zhao | H04W 36/0022 |
| 2021/0329508 | A1* | 10/2021 | Gopal | H04B 7/0602 |

OTHER PUBLICATIONS

3GPP TS 38.322 V15.5.0 (Mar. 2019), Technical Specification, 3rd Generation Partnership Project; Technical Specification Group Radio Access Network; NR; Radio Link Control (RLC) protocol specification (Release 15), 33 pages.

3GPP TS 38.323 V15.7.0 (Sep. 2020), Technical Specification, 3rd Generation Partnership Project; Technical Specification Group Radio Access Network; NR; Packet Data Convergence Protocol (PDCP) specification (Release 15), 26 pages.

3GPP TS 38.331 V15.11.0 (Sep. 2020), Technical Specification, 3rd Generation Partnership Project; Technical Specification Group Radio Access Network; NR; Radio Resource Control (RRC) protocol specification (Release 15), 541 pages.

Vivo, "Discussion on the selective PDCP retransmission at UL PDCP PDU", 3GPP TSG-RAN WG2 Meeting #107bis, Oct. 14-18, 2019, R2-1912345, 5 pages.

Apple, "UE based PDCP Duplication Enhancement", 3GPP TSG-RAN WG2 Meeting #107bis, Oct. 14-18, 2019, R2-1912463, 2 pages.

Qualcomm Incorporated, "PDCP uplink transmit operation for split-bearer", Change Request, 3GPP TSG-RAN2#107bis, Oct. 14-18, 2019, R2-1912997, 2 pages.

Qualcomm Incorporated, "Value of UE-based PDCP duplication", 3GPP TSG-RAN WG2 Meeting #107bis, Oct. 14-18, 2019, R2-1913639, 4 pages.

International Search Report dated Jan. 26, 2021 in connection with International Patent Application No. PCT/KR2020/014188, 4 pages.

Written Opinion of the International Searching Authority dated Jan. 26, 2021 in connection with International Patent Application No. PCT/KR2020/014188, 3 pages.

Supplementary European Search Report dated Jul. 19, 2022, in connection with European Application No. 20877726.8, 9 pages.

* cited by examiner

| 1 | 2 | 3 | 4 | 5 | 6 | 7 | 8 |
|---|---|---|---|---|---|---|---|
| LCID | | | | | | Cell Group Id | R |

MAC CE without Timing information

FIG.8A

| 1 | 2 | 3 | 4 | 5 | 6 | 7 | 8 |
|---|---|---|---|---|---|---|---|
| LCID | | | | | | Cell Group Id | R |
| Timing Information | | | | | | | |

MAC CE with Timing information

FIG.8B

METHODS AND SYSTEMS FOR RECOVERING DANGLING DATA IN A NR LEG OF A SPLIT BEARER

CROSS REFERENCE TO RELATED APPLICATIONS

This application is based on and claims priority under 35 U.S.C. § 119(a) to Indian Provisional Patent Application Serial No. 201941042176 (PS), filed on Oct. 17, 2019, in the Indian Intellectual Property Office, and to Indian Complete Patent Application Serial No. 201941042176 (CS), filed on Oct. 5, 2020, in the Indian Intellectual Property Office, the disclosure of which are incorporated herein by reference in their entireties.

BACKGROUND

1. Field

Embodiments herein relate to Uplink (UL) leg switching in split bearer networks, and more particularly to methods and systems for enabling recovery of data that is dangling in a Long Term Evolution (LTE) UL leg or a New Radio (NR) UL leg, due to UL leg switch.

2. Description of Related Art

In split bearer networks, there are possibilities, wherein an Uplink (UL) leg switch can be triggered by a network to switch UL transmission by a User Equipment (UE). The network can trigger the UL leg switch for the Long Term Evolution (LTE) UL leg or the New Radio (NR) UL leg. When the UL leg switch is triggered, the network can stop or resume allocation of UL grants on either of the UL legs (LTE or NR), if the UL data transmitted by the UE crosses an ul-DataSplitThreshold configured by the network. For example, if the network intents to trigger UL leg switch from NR to LTE due to poor channel condition in the NR channel, and if the amount of UL data transmitted had crossed the ul-DataSplitThreshold, the network may stop providing UL grants to a User Equipment (UE) on the NR UL leg. This may cause all packets in the NR UL leg, which has already been sent by a Packet Data Convergence Protocol (PDCP) layer to Radio Link Control (RLC) and Media Access Control (MAC) layers of NR, to dangle in the NR UL leg. Further, if a PDCP discard timer expires, the UE is likely to discard the packets, which may result in data loss and a drop in throughput.

If the network stops providing UL grants in NR leg of the split bearer due to UL leg switching, the UE can send Scheduling Requests (SRs) to obtain UL grants from the network. The SRs are sent in order to send Buffer Status Report (BSR), which considers PDCP, RLC, and MAC Protocol Data Units (PDUs). If the network does not provide any UL grant on NR leg, after the UE has sent the maximum possible number of SRs, the UE may trigger a NR Random Access Channel (RACH). This is likely to lead to Radio Link Failure (RLF).

Due to fluctuating network conditions, if the network continues to vary (increase/decrease) the allocation of UL grants in both the legs, there is a possibility of encountering a PDCP sequence number gap during UL transmission. The fluctuating network condition also causes frequent dangling of data in the LTE/NR Uplinks. The frequent dangling of data results in a drop in the UL throughput.

If the network does not allocate the required number of UL grants prior to UL leg switching, the UE attempts to clear the PDUs in the NR leg, i.e., NR RLC and NR MAC. The UE sends BSR comprising of PDCP, RLC and MAC PDUs. This may result in dangling of data, as the PDCP is likely to continue send data to the NR RLC and NR MAC as long as the UE is having UL grants on the NR leg irrespective of the number of UL grants available to the UE.

FIG. 1 depicts an example scenario, wherein the allocation of UL grants in the NR leg is suspended due to UL leg switching. Currently, the network uses RRC signaling for sending parameters pertaining to UL leg switch. The network configures ul-datasplitthreshold in a Radio Resource Control (RRC) reconfiguration message. When the amount of UL data crosses the ul-datasplitthreshold, the UE can send UL data on either Master Cell Group (MCG) leg (LTE), the SCG leg (NR), or both MCG and SCG legs, based on UL grants. If UL channel condition of NR becomes poor, the network might switch the UL data path by suspending the allocation of UL grants on NR and providing UL grants on LTE. Once NR channel condition revives, the network might resume allocating UL grants over the NR leg.

FIG. 2 depicts an example scenario, wherein there is an occurrence of dangling of data in NR leg due to the poor condition of NR UL channel. If the network configures NR as the primary UL path, NR PDCP can push UL data to the NR RLC leg. The NR MAC entity can push the data in the UL based on the UL grants available to the UE. If amount of UL data transmitted reaches the ul-DataSplitThreshold, configured by the network, and NR UL channel condition is not optimal, network might suspend providing UL grants on the NR leg and instead provide UL grants on the LTE leg.

When there are no UL grants available and the UE is not receiving any grants on the NR leg, the PDUs that have been sent to the NR RLC from the NR PDCP will be in a dangling condition, as there are no means available for sending the PDUs that have been already pushed to the NR RLC without UL grants. The PDUs in dangling condition have to be discarded, which contributes to data loss and degradation of the throughput. The throughput loss is likely to increase, if the condition of the NR UL channel fluctuates rapidly due to transmitter power limitation, obstruction, phasor angle mismatch, and so on.

If the UE does not have UL grants on NR leg for sending BSR, for transmitting the PDUs that have already been submitted to NR RLC, then the UE may send Scheduling Requests (SRs) to the network for obtaining UL grants. The SRs are sent to the network for sending the BSR. The UE continues to trigger SRs, until the UE obtains the UL grants required for sending the BSR, for clearing the dangling data on the NR leg. If number of SRs triggered by the UE reaches the maximum value configured by the network, the UE can declare NR Radio Link Failure (RLF) or SCG failure and perform RACH on NR. This may lead to NR link disconnection.

FIG. 3 depicts an example scenario, wherein gaps in PDCP Sequence Number (SN) are encountered due to interruption in the continuous flow of data. The gaps in the PDCP SN are encountered due to the dangling of data in the NR leg. Consider that 'x' PDUs have been transmitted through the NR leg, amongst 'x+y' PDUs that have been transmitted by NR PDCP to NR RLC. If NR UL leg switch occurs after 'x' PDUs are transmitted, there will be no UL grants in the NR leg available. As a result 'y' PDUs will be dangling in the NR leg. As 'y' PDUs are received, it is likely that a SN gap will be created at the receiver side, as PDUs with SN starting from 'x+y+1' will be transmitted using UL grants through LTE RLC, after UL leg switch.

For example, consider that UL grants are received on NR RLC and NR PDCP transmits PDUs with SNs 'x' to 'x+50'. Consider that PDUs with SNs 'x' to 'x+25' have been transmitted, and PDUs with SNs 'x+26' to 'x+50' are in the buffer. At this stage, consider that UL leg switch is triggered. The network stops allocating NR grants and allocates LTE UL grants. The PDCP transmits PDUs with SNs 'x+51' to 'x+100' through the LTE RLC, which are received by the network. As the PDUs with SNs 'x+26' to 'x+50' are not received by the network, the PDUs with SNs 'x+26' to 'x+50' create a SN gap at the network side.

FIG. 4 depicts an example dangling of PDUs caused by back-and-forth UL leg switching on LTE and NR legs. As depicted in FIG. 4, consider that UL grants are received on NR leg and the PDCP pushes 200 PDUs to the NR RLC and NR MAC, out of which 100 PDUs are transmitted. The remaining 100 PDUs will be in the NR RLC and NR MAC. At this stage, consider that UL leg switch has occurred, and UL grants are received for transmission through the LTE leg. As a result, 100 PDUs will be dangling in the NR buffer.

Consider that the PDCP pushes 100 PDUs to the LTE RLC and the LTE MAC, and UL leg switch has occurred after 60 PDUs are transmitted. As a result, 40 PDUs will be dangling in the LTE RLC and the LTE MAC. Once UL leg switch has occurred, UL grants are received for transmission through the NR leg.

Consider that the PDCP pushes 200 PDUs to the NR RLC and the NR MAC, and UL leg switch has occurred after 130 packets have been transmitted. As a result, 70 PDUs will be dangling in the NR RLC and the NR MAC, unprocessed or unattended. At this stage, UL grants are received for transmission through the LTE leg.

The principal object of the embodiments herein is to disclose methods and systems for enabling recovery of data, by a User Equipment (UE) with split bearer configuration, which is dangling in a New Radio (NR) UL leg, due to UL leg switch triggered by a network, wherein the UE is connected to the network.

Another object of the embodiments herein is to enable the UE to predict NR UL leg switch by determining whether the number of UL grants allocated to the UE, for transmission of UL data through the NR leg, is less than a predetermined threshold number of UL grants for more than a predetermined threshold time duration, and whether the number of UL retransmissions is greater than a predetermined threshold number of UL retransmissions during the predetermined threshold time duration.

Another object of the embodiments herein is to perform the recovery of the Protocol Data Units (PDUs), dangling in a NR buffer, on predicting that the network is likely to trigger UL leg switch, wherein the recovery is performed by sending the PDUs to Long Term Evolution (LTE) Radio Link Control (RLC) and LTE Media Access Control (MAC).

Another object of the embodiments herein is to prevent duplication of PDUs by allowing the UE to delete the PDUs from the LTE RLC and LTE MAC, if it is determined that the PDUs have been transmitted from the LTE RLC and LTE MAC, or NR RLC and NR MAC respectively.

Another object of the embodiments herein is to prevent Packet Data Convergence Protocol (PDCP) layer from pushing PDUs to NR RLC and NR MAC, after detecting that the network has triggered NR UL leg switch, and allow the UE to send BSR comprising of only NR RLC and MAC PDUs, that are dangling in the NR buffer, in order to clean the NR buffer.

Another object of the embodiments herein is to prevent the UE from triggering Scheduling Requests (SRs) if NR leg does not have any UL grants and LTE leg is having UL grants.

Another object of the embodiments herein is to enable the network to send indication to the UE about the network triggering NR UL leg switch, wherein the indication is sent through a MAC Control Element (CE) sub-header, wherein the UE can determine that the network is going to trigger UL leg switch on NR leg on receiving the indication, wherein the MAC CE indicator can be defined with/without timing information.

Another object of the embodiments herein is to enable the recovery of the PDUs dangling in the NR buffer, by enabling the network to trigger a PDCP status report, wherein the generation of the PDCP status report is triggered by the network if the split Dedicated Radio Bearer (DRB) is configured as Acknowledged Mode (AM).

SUMMARY

Accordingly, the embodiments provide methods and systems for enabling recovery of data that is dangling in a New Radio (NR) leg, due to the triggering of NR Uplink (UL) leg switching by a network. The embodiments allow a User Equipment (UE) to recover the dangling data in the NR UL leg, after the triggering of NR UL leg switch by the network. The embodiments enable the UE to predict the likelihood of the network triggering the NR UL leg switch by identifying whether the number of UL grants allocated to the UE, for transmission through the NR leg, is less than a predetermined threshold for more than a predetermined threshold time duration, and whether the number of UL retransmissions within the predetermined threshold time duration is greater than a predetermined threshold number of UL retransmissions.

The embodiments include preventing the Packet Data Convergence Protocol (PDCP) layer from pushing Protocol Data Units (PDUs) to NR Radio Link Control (RLC) and NR Media Access Control (MAC) and after predicting that the network has triggered an NR UL leg switch. The embodiments herein allow the UE to send BSR comprising of NR RLC and MAC PDUs that are dangling in NR leg, in order to clean the NR buffer. The embodiments herein allow the recovery of the PDUs, dangling in the NR buffer, by sending the PDUs to Long Term Evolution (LTE) RLC and LTE MAC respectively, on predicting that the network is likely to trigger NR UL leg switch. The embodiments herein allow the UE to delete the PDUs from the LTE RLC and LTE MAC, if the PDUs have been transmitted from the LTE RLC and LTE MAC or NR RLC and NR MAC respectively, in order to avoid duplication of PDUs.

The embodiments enable the network to send indications to the UE about the network triggering NR UL leg switch. The indications can be sent to the UE using MAC Control Element (CE) sub-header. The embodiments enable the UE to determine whether the network is going to trigger NR UL leg switch on NR leg on receiving the indication. The network can define the MAC CE indicator with/without timing information. If the network defines the MAC CE indicator without timing information, the UE, on receiving the MAC CE indicator, can determine that the network has triggered NR UL leg switch. If the network defines the MAC CE indicator with the timing information, the UE, on receiving the MAC CE indicator, can determine that the network is going to trigger NR UL leg switch after a certain time period.

The embodiments herein enable the recovery of the PDUs dangling in the NR buffer, by enabling the network to trigger a PDCP status report, wherein PDCP status report is generation by the network if it is determined that the split Dedicated Radio Bearer (DRB) is configured as Acknowledged Mode (AM).

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, through out which like reference letters indicate corresponding parts in the various figures. The embodiments herein will be better understood from the following description with reference to the drawings, in which:

FIGS. 8A and 8B depict utilization of Media Access Control (MAC) Control Element (CE) by the network to inform the UE about the triggering of UL leg switch, according to embodiments as disclosed herein;

DETAILED DESCRIPTION

Figure 1:
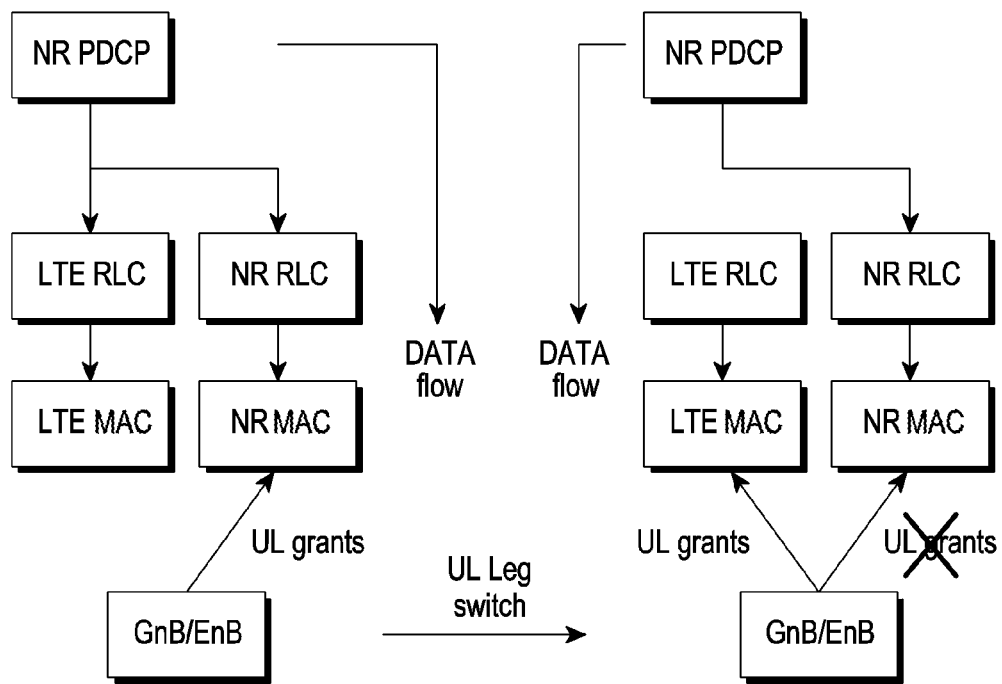
FIG. 1 depicts an example scenario, wherein the allocation of UL grants in the NR leg is suspended due to UL leg switching.
Figure 2:
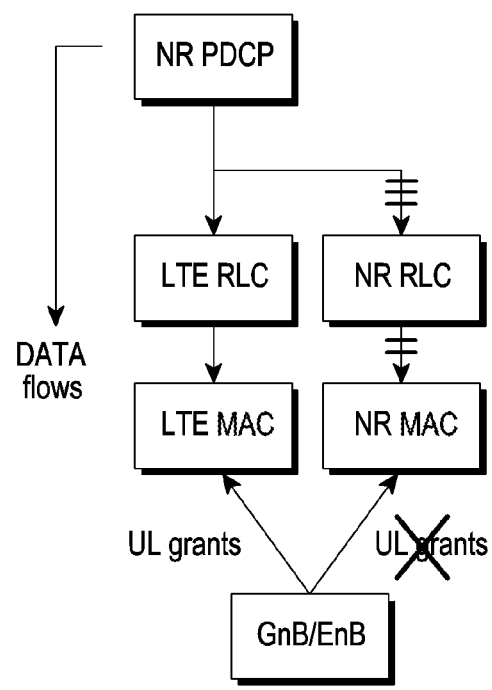
FIG. 2 depicts an example scenario, wherein there is an occurrence of dangling of UL data in NR leg due to the poor condition of NR UL channel.
Figure 3:
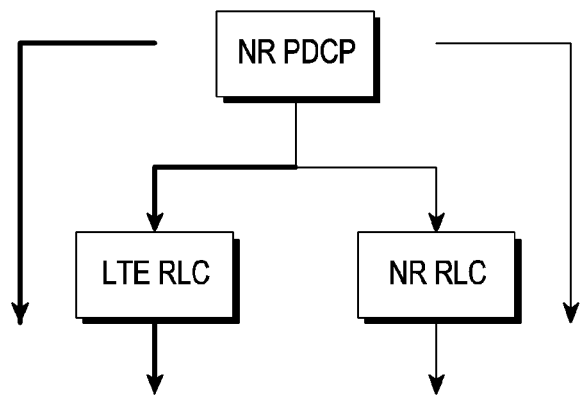
FIG. 3 depicts an example scenario, wherein gaps in Packet Data Convergence Protocol (PDCP) Sequence Number (SN) are encountered due to interruption in the continuous flow of data.
Figure 4:
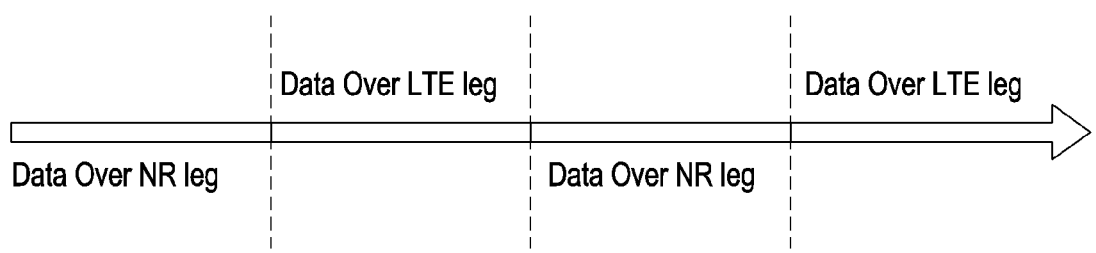
FIG. 4 depicts an example dangling of Protocol Data Units (PDUs) caused by back-and-forth UL leg switching on Long Term Evolution (LTE) and NR legs.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for enabling recovery of data that is dangling in a New Radio (NR) leg, due to the triggering of NR Uplink (UL) leg switching by a network. The embodiments provide both User Equipment (UE) and network based solutions for recovering the dangled data.

Referring now to the drawings, and more particularly to FIGS. 5 through 10, where similar reference characters denote corresponding features consistently throughout the figures, there are shown preferred embodiments.

Figure 5:
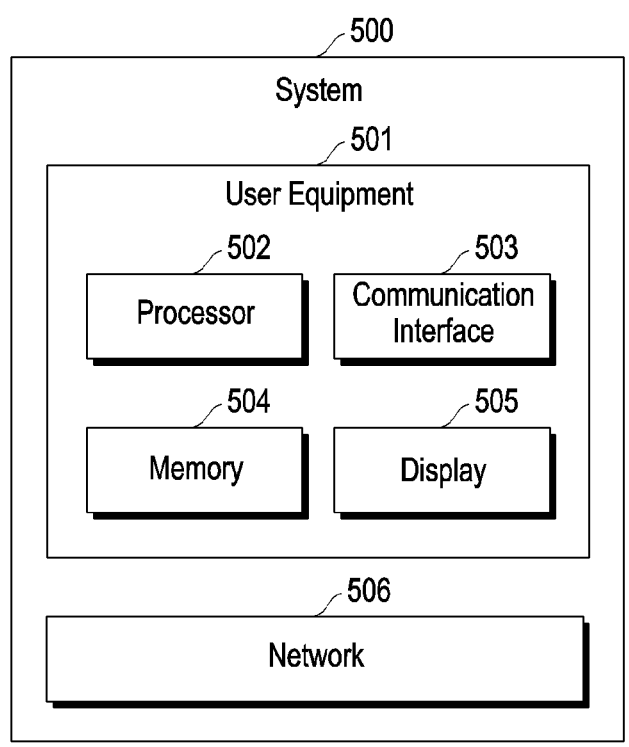
FIG. 5 depicts a system comprising a UE and a network 506, wherein the User Equipment (UE) is configured to predict the occurrence of the network triggering a UL leg switch, according to embodiments as disclosed herein.

FIG. 5 depicts a system 500 comprising a UE 501 and a network 506, wherein the UE 501 is configured to predict the occurrence of the network 506 triggering a UL leg switch, according to embodiments as disclosed herein. Consider that the UE 501 is connected to the network 506. In an embodiment, the network 506 can include an evolved Node B (eNB) and an Evolved Packet Core (EPC) or a Next Generation Node B (gNB) and a Next Generation Core (NGC). Consider that the UE 501 is operating in split bearer configuration. As depicted in FIG. 5, the UE 501 comprises of a processor 502, a communication interface 503, a memory 504, and a display 505. The processor 502 is having Artificial Intelligence (AI) capabilities. The UE 501 is capable of sending UL data and receiving Downlink (DL) data through an Long Term Evolution (LTE) leg, a NR leg, or both the LTE leg and the NR leg.

Consider that the UE 501 is sending UL data to the network 506 using the NR leg. The UE 501 can transmit UL packets through NR Radio Link Control (RLC) and NR Media Access Control (MAC). The UE 501 can send the UL data to the network 506 using NR UL grants that have been allocated to the UE 501 by the network 506. The network 506 is likely to suspend allocation of UL grants and trigger NR UL leg switch if the network 506 detects that NR channel condition is non-optimal, sub-optimal, or poor. Therefore, if the UE 501 can detect the conditions of the NR channel, and determine that the condition of the NR channel is degrading; the UE 501 can predict that the network 506 is likely to trigger NR UL leg switching.

If the UE 501 does not receive NR UL grants, or if the number of NR UL grants that are available to the UE 501 is not sufficient to transmit all Protocol Data Units (PDUs) in the NR RLC and NR MAC, the PDUs would be dangling in the NR leg. The number of PDUs dangling in the NR leg increases if Packet Data Convergence Protocol (PDCP) layer continues to push PDUs to the NR RLC and NR MAC.

In order to prevent the dangling of data due to UL leg switching, the embodiments enable the UE 501 to predict the possibilities of the network 506 triggering UL leg switch. The network 506 can trigger UL leg switching when UL channel condition of the NR leg, through which UL data is being currently transmitted, starts degrading. The UE 501 can identify, through the processor 502, the degradation of the NR UL leg based on a plurality of factors. Example factors that allow the UE 501 to identify that the degradation of the NR UL channel is are, but not limited to, transmitted power, Modulation and Coding Scheme (MCS), Reference Signal Received Power (RSRP), Beam RSRP (RSRP), Signal to Noise Ratio (SNR), UL retransmissions, path loss and PDCP discard timer.

The processor 502 can determine that the NR channel is degrading if the power used by the UE 501 to transmit PDUs is close to the Maximum Transmit Power Limit (MTPL) value, there is a drop in UL MCS values, the number of UL retransmissions is increasing, Reference Signal Received Power (RSRP) is low, Beam RSRP (RSRP) is low, Signal to Noise Ratio (SNR) is poor, the number of UL transmissions at MTPL is greater than a threshold number of UL transmissions, activation of PDCP discard timer (after PDCP discard timer is activated if PDUs in the RLC and MAC layers are not transmitted), and so on.

The processor 502 can check details pertaining to the network 506 such as Public Land Mobile Network (PLMN) Identity (ID), Cell-ID, location ID, and so on. If the processor 502 had previously determined that the condition of the NR channel is poor in particular cells and/or locations that are particular PLMNs, the processor 502 can check if the UE 501 is availing services from the particular cells, locations, and PLMNs. Based on the processor 502 determining whether the condition of NR UL leg is degrading, the processor 502 can predict the likelihood of the network 506 triggering NR UL leg switch.

The processor 502 can predict a time instance of likelihood of the network 506 triggering the UL leg switch, based on a plurality of parameters. The processor 502 includes a learning module 502a, which can provide the values of the plurality of parameters as output. The learning module 502a can determine the values of the plurality of parameters based on the plurality of factors, which are the inputs to the learning module 502a. The plurality of parameters include a threshold number of UL grants that are available to the UE 501, a threshold time period for which the number of UL grants available to the UE 501 is less than the threshold number of UL grants, a threshold number of retransmissions within the threshold time period, a threshold number of UL transmissions at MTPL, and a threshold time period after which the PDCP discard timer will be activated. With variations in the input values of the plurality of factors, the output values of the plurality of parameters are likely to change.

For example, the learning module 502a determines, based on the plurality of factors, the values of the threshold number of UL grants available to the UE 501, the threshold time period for which the number of UL grants available to the UE 501 is less than the threshold number of UL grants, the threshold number of retransmissions within the threshold time period, the threshold number of UL transmissions at MTPL, and the threshold time period after which the PDCP discard timer will be activated. The processor 502 can predict that UL leg switch is likely to be triggered by the network 506 at a particular time instance, if at least one condition is satisfied. The conditions are: number of UL grants available to the UE 501 for UL transmission is less than the threshold number of UL grants; time interval, for which the number of UL grants available to the UE 501 for UL transmission is less than the threshold number of UL grants, is greater than the threshold time period; the number of retransmissions within the threshold time period is greater than the threshold number of retransmissions, the number of UL transmissions at MTPL is greater than the threshold number of UL transmissions at MTPL, and the time period after which the PDCP discard timer is activated is less than threshold time period after which the PDCP discard timer was supposed to be activated.

Further, the learning module 502a can update the values of the plurality of parameters based on actual instance of triggering of the UL leg switching. The learning module 502a can update the values of the plurality of parameters if the prediction is inaccurate, i.e., the actual instance of triggering of UL leg switching by the network 506 occurs prior to, or after, the predicted instance of the triggering of UL leg switching. In an embodiment, the learning module 502a can utilize a cost function to minimize differences between the actual and predicted time instances of the network 506 triggering UL leg switch and update the values of the plurality of parameters.

For example, if the UL leg switch has occurred, and if the number of UL grants available to the UE 501 for UL transmission is greater than the threshold number of UL grants; if the time interval, for which the number of UL grants available to the UE 501 for UL transmission is less than the threshold number of UL grants, is less than the threshold time period; and if the number of retransmissions within the threshold time period is less than the threshold number of retransmissions; the learning module 502*a* can update the values of the plurality of parameters. In this scenario, the threshold number of UL grants is updated to the number of UL grants available to the UE 501 when the UL leg switch is triggered; the threshold time period is reduced to the time period for which the number of UL grants available to the UE 501 is equal to the updated threshold number of UL grants; and the threshold number of retransmissions is reduced from the earlier value of threshold number of retransmissions.

FIG. 5 shows exemplary units of the system 500, but it is to be understood that other embodiments are not limited thereon. In other embodiments, the system 500 may include less or more number of units. Further, the labels or names of the units of the system 500 are used only for illustrative purpose and does not limit the scope of the invention. One or more units can be combined together to perform same or substantially similar function in the system 500.

Figure 6:
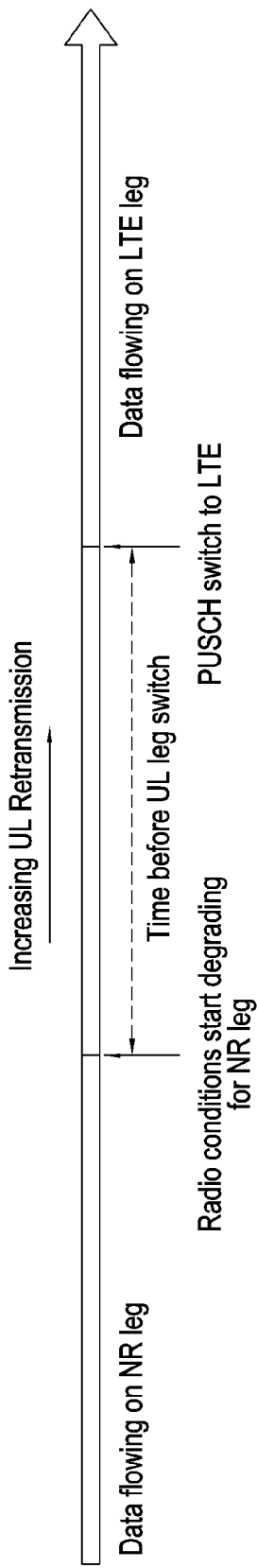
FIG. 6 depicts a timeline, within which the UE initiates a procedure for recovering PDUs that are dangling in the NR UL leg after predicting the likelihood of the network triggering the UL leg switch, according to embodiments as disclosed herein.

FIG. 6 depicts a timeline, within which the UE 501 initiates a procedure for recovering PDUs that are dangling in the NR UL leg after predicting the likelihood of the network 506 triggering the UL leg switch, according to embodiments as disclosed herein. Consider that the UE 501 is transmitting UL data using the NR leg, and had determined that the condition of the NR UL leg had deteriorated. The UE 501 can continue to monitor the number of UL grants that are while the UE transfers UL PDUs over the NR leg, and if ul-DataSplitThreshold has been reached. Once the condition of the NR leg starts degrading, the number of UL grants that are available to the UE 501 will start decreasing. If the number of UL grants decreases below the threshold number of UL grants (NulTh), the UE 501, can initiate a threshold timer (T1). Thereafter, the UE 501 can monitor the number of UL retransmissions, as the threshold timer is incremented. The threshold timer defaults after a time period has elapsed. The time period specifies the threshold time period for which the number of UL grants decreases below the threshold number of UL grants.

If the processor 502 determines that the number of UL retransmissions within the threshold time period is greater than a threshold number of retransmissions (Nretrans), prior to the expiry of the threshold timer; or if the number of UL grants is below the threshold number of UL grants, prior to the expiry of the threshold timer; the UE 501 can predict that the network is likely to trigger NR UL leg switch. The processor 502 can be configured to send Buffer Status Report (BSR) on NR leg for NR RLC PDUs and NR MAC PDUs, if the UE 501 predicts that the network 506 is likely to trigger NR UL leg switch. The processor 502 can be configured to not include NR PDCP PDUs in the BSR. Thereafter, the NR PDCP will not push further PDUs to NR RLC. By this procedure (of including NR RLC PDUs and NR MAC PDUs in the BSR), the UE 501 attempts to send the PDUs to the NR RLC and NR MAC prior to the network 506 triggering UL leg switch as predicted.

If the UE 501 is not able to obtain any UL grant on the NR leg, after UL leg switch is triggered, and receives UL grant on the LTE leg, the processor 502 can initiate UL transmission over LTE leg. The processor 502 will discard the NR RLC PDUs and the NR MAC PDUs, in the NR leg, which are yet to be sent to the network 506. The processor 502 can transmit the NR RLC PDUs and the NR MAC PDUs, which have been discarded from the NR leg, and over the LTE leg. In this way UE 501 can recover the dangling data and no data loss will take place.

Figure 7:
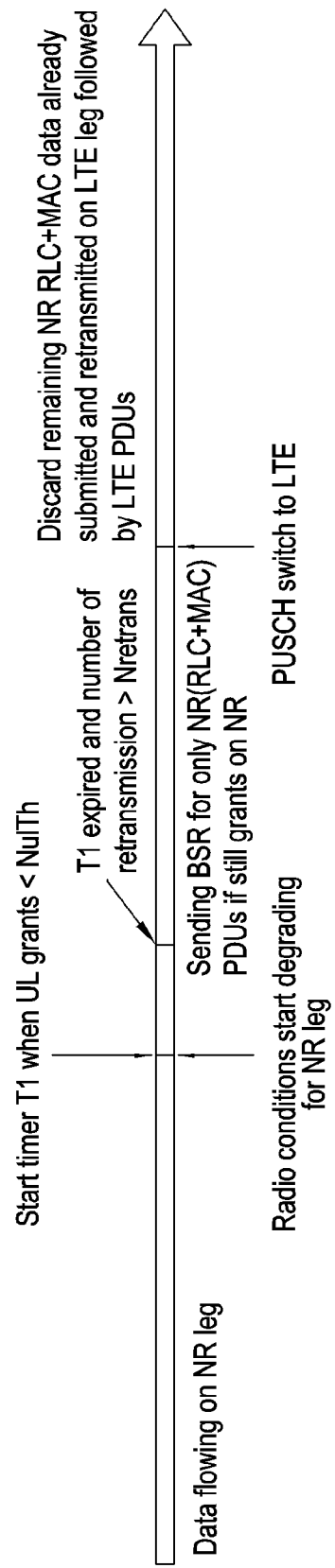
FIG. 7 depicts a timeline, within which the UE initiates another procedure for recovering the PDUs that are dangling in the NR UL leg after predicting the likelihood of the network triggering the UL leg switch, according to embodiments as disclosed herein.

FIG. 7 depicts a timeline, within which the UE 501 initiates another procedure for recovering PDUs that are dangling in the NR UL leg after predicting the likelihood of the network 506 triggering the UL leg switch, according to embodiments as disclosed herein. Consider that the UE 501 is transmitting UL data using the NR leg, and had determined that the condition of the NR UL leg had deteriorated. If the processor 502 determines that the number of UL retransmissions within the threshold time period is greater than the threshold number of retransmissions (Nretrans), prior to the expiry of the threshold timer (which expires after the threshold time period has elapsed, wherein the threshold time period specifies the time period for which the number of UL grants decreases below the threshold number of UL grants); or if the number of UL grants is below the threshold number of UL grants, prior to the expiry of the threshold timer; the UE 501 predicts that the network 506, is likely to trigger NR UL leg switch. Thereafter, the processor 502 is configured to create copies of the NR RLC PDUs and send the copies to the LTE RLC leg. Similarly, the processor 502 is configured to create copies of the NR MAC PDUs and send the copies to the LTE MAC leg.

The processor 502 can mark the NR RLC PDUs and the NR MAC PDUs once the NR RLC PDUs and the NR MAC PDUs have been transmitted from the LTE leg or the NR leg. The processor 502 can wait to receive acknowledgements from the network 506, in order to ascertain whether the network 506 had received the PDUs. Once the UE 501 receives the acknowledgements, the processor 502 can delete the PDUs from the LTE/NR leg, if the PDUs have been transmitted from the NR/LTE leg. This can prevent PDCP duplication. This will minimize the t-reordering timer expiry at the network as well. Meanwhile, the processor 502 can be configured to send the BSR for NR RLC PDUs and NR MAC PDUs, once the UE 501 had predicted that the network 506 is likely to trigger NR UL leg switch. The processor 502 can be configured to not include NR PDCP PDUs in the BSR. Once the UL leg switch is triggered by the network, the UE 501 is not able to obtain any UL grant on the NR leg. However, the UE 501 is able to receive UL grant on the LTE leg. The processor 502 can initiate UL transmission over LTE leg and the PDCP can stop pushing PDUs on the NR leg.

FIGS. 8A and 8B depict utilization of MAC Control Element (CE) by the network 506 to inform the UE 501 about the triggering of UL leg switch, according to embodiments as disclosed herein. The network 506 can send UL leg switch indication to the UE 501 using MAC CE sub-header. On receiving this indication, the UE 501 can determine that the network 506 is going to trigger UL leg switch on either of the LTE or NR legs. In an embodiment, the network 506 can utilize the reserved bits of MAC CE sub-header to indicate the UE 501 about the triggering of UL leg switch by the network 506. In the MAC CE sub-header, bit numbers 33 to 46 bits are kept reserved. In an example, the network can use the 33$^{rd}$ bit to indicate the UE 501 about the triggering of UL leg switch by the network 506.

As depicted in FIG. 8A, the MAC CE sub-header does not include the timing information. On receiving, by the UE 501, the MAC CE sub-header, the processor 502 can determine that the network 506 has triggered UL leg switch. The MAC CE sub-header comprises of one octet. In this one octet, the first 6 bits will indicate the Logical Channel ID (LCID) for which UL leg switch has to be applied. The 7th bit can indicate cell group ID. The cell group ID indicates the leg, i.e., LTE/NR, on which the UL leg is triggered or is going to be triggered. An example cell group ID is (MCG 0, SCG 1). If LTE is configured as MCG and NR as SCG, then this cell group ID indicates that UL leg is triggered on the NR leg. Another example cell group ID is (MCG 1, SCG 0). If LTE is configured as MCG and NR as SCG, then this cell group ID indicates that UL leg is triggered on the LTE leg. The last bit in the octet is reserved.

As depicted in FIG. 8B, the MAC CE sub-header includes the timing information. On receiving, by the UE 501, the MAC CE sub-header, the processor 502 can determine that the network 506 is going to trigger UL leg switch after a certain period of time. The MAC CE sub-header comprises of two octets. The first octet is same as that of MAC CE sub-header without the timing information. The second octet can comprise of timing information that is to be applied before UL leg switching.

On receiving the MAC CE sub-header, with/without the timing information, from the network 506, the UE 501 can apply UL leg switch. If the received MAC CE sub-header does not include the timing information, the UE 501 can discard all PDUs, pending for transmission, on the UL leg on which UL leg switch has been triggered by the network 506. The UE 501 can retransmit the discarded PDUs on the other UL leg, based on an indication provided in the 7$^{th}$ bit of the MAC CE sub-header. This leads to the recovery of dangling data. The UE 501 refrains from initiating Scheduling Request (SR) triggers, as the UE 501 is informed about the triggering of UL leg switch. As multiple SRs are not triggered, NR Radio Link Failure (RLF) due to max SR retransmissions will not occur and the loss of NR connection can be prevented.

If the received MAC CE sub-header includes the timing information, the processor 502, on receiving the MAC CE sub-header, can prevent pushing of new PDUs from PDCP to the RLC of the UL leg in which UL leg switch has been triggered. The processor 502 can initiate a timer, which is set to expire when UL leg switch is triggered. The processor 502 can configure the timer based on the timing information. The BSR is sent to the network 506 after calculation with information about data to be re-transmitted (MAC). The UE 501 can consider Hybrid Automatic Repeat Request (HARQ) retransmission data in HARQ buffer during BSR calculation. On expiry of the timer, PDUs on the UL leg (on which UL leg switch has been triggered) that are pending for transmission, can be discarded and the PDUs can be retransmitted on the other UL leg. The processor 502 can identify the PDU which already have been discarded so that the other UL leg does not transmit the same PDU again.

In an embodiment, after receiving the MAC CE sub-header and recovering the dangled PDUs (after UL leg switch has been triggered) through the retransmission of the PDUs through the other UL leg, the UE 501 can send acknowledgement to the network 506 to indicate that the UL leg switch has been applied properly. For providing this indication, the UE 501 can use any one of the reserved bit of the MAC CE sub-header. In an example, the UE 501 had used the 33$^{rd}$ bit of MAC CE sub-header. The UE 501 can send the MAC CE sub-header as an acknowledgement, to the network 506, as a confirmation of the UL leg switch.

In an embodiment, once the UL leg switch is triggered, the network 506 initiates a procedure for recovering PDUs that are dangling in a UL leg, on which UL leg switch has occurred. The procedure involves triggering a PDCP status report. In order to recover the dangling PDUs, after each UL leg switch, the network can trigger PDCP status reporting. The PDCP status report can be triggered if the split Dedicated Radio Bearer (DRB) is configured as Acknowledged Mode (AM) mode.

The PDCP status report can be triggered after the network 506 had sent the MAC CE sub-header to the UE 501, to indicate that the network 506 is going to trigger, or has triggered, UL leg switch. If the network 506 does not send the MAC CE sub-header to the UE 501, the PDCP status report can be triggered once the network 506 has decided to trigger UL leg switch. Once the PDCP status report is generated, the network 506 can send the PDCP status report to the UE 501. If the UL leg switch has been triggered on the NR leg, the UE 501 can identify PDCP Serving Data Units (SDUs) that needs to be transmitted through the LTE UL leg based on the PDCP status report received from the network 506.

Once the PDCP status report is triggered, the network 506 can compile a PDCP status report by setting the First missing Count (FMC) field to RX_DELIV. If RX_DELIV is less than RX_NEXT, a bitmap field can be allocated. The network 506 can set the bitmap field to '0' for all PDCP SDUs that have not been received, and optionally for PDCP SDUs for which decompression has failed. The network 506 can set the bitmap field to '1' for all PDCP SDUs that have been received by the network 506. Once the UE 501 receives the PDCP status report, the processor 502 can identify the bits in the bitmap field that are set to '1' or if the associated COUNT value is less than the value of the FMC field, the processor 502 can discard those PDCP SDUs. The UE 501 can transmit the remaining SDUs on the LTE UL leg (considering UL leg switch is triggered on the NR leg). This leads to lossless data recovery during UL leg switching.

Figure 9:
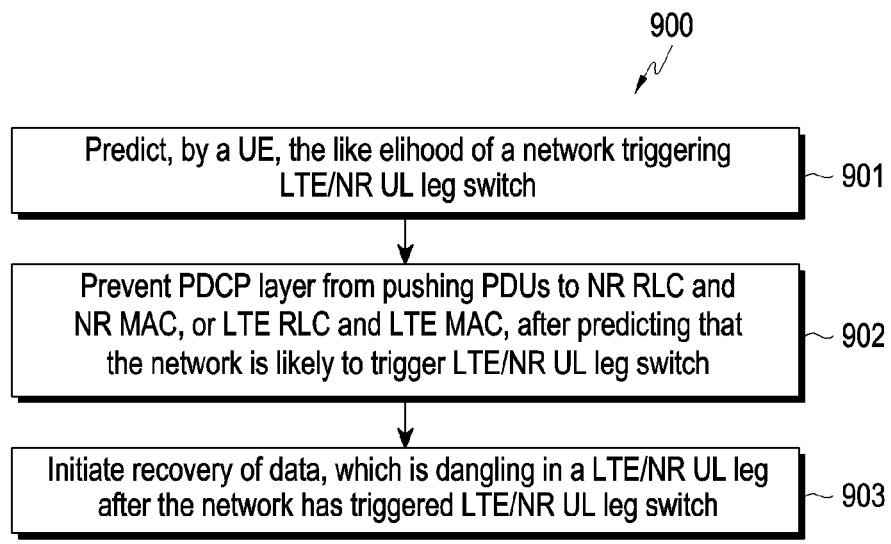
FIG. 9 is a flowchart depicting a method for enabling recovery of data that is dangling in the NR UL leg due triggering of NR UL leg switching by the network, according to embodiments as disclosed herein.

FIG. 9 is a flowchart 900 depicting a method for enabling recovery of data that is dangling in NR UL leg due to the triggering of UL leg switching by the network 506, according to embodiments as disclosed herein. At step 901, the method includes predicting the likelihood of the network 506 triggering the NR UL leg switch. The network 506 can trigger UL leg switching when UL channel condition of the UL leg starts degrading. The embodiments include detecting the degradation of the UL leg based on a plurality of factors. Example factors are, but not limited to, transmitted power, MCS value, number of UL retransmissions, RSRP, RSRP, SNR, path loss, PDCP discard timer, and so on.

In an embodiment, the UE 501 can determine that there is a degradation of the NR UL leg based on at least one condition comprising power used by the UE 501 to transmit PDUs is close to MTPL, drop in UL MCS value, increase in the number of UL retransmissions, low RSRP, low BRSRP, poor SNR, number of UL transmissions at MTPL is greater than a threshold number of UL transmissions, activation of PDCP discard timer, and so on.

The embodiments include predicting a particular instance of time, at which the network 506 is likely to trigger the UL leg switch, based on a plurality of parameters. The embodiments include determining the values of the plurality of parameters based on the plurality of factors. The plurality of parameters include a threshold number of UL grants that are available to the UE 501, a threshold time period for which the number of UL grants available to the UE 501 is less than the threshold number of UL grants, a threshold number of retransmissions within the threshold time period, a threshold number of UL transmissions at MTPL, and a threshold time period after which the PDCP discard timer will be activated.

With variations in the values of the plurality of factors, the values of the plurality of parameters are likely to change.

The embodiments include predicting that UL leg switch will be triggered by the network 506 at the particular time instance if at least one condition is satisfied. The conditions are: the number of UL grants available to the UE 501 for UL transmission is less than the threshold number of UL grants; the time interval, for which the number of UL grants available to the UE 501 for UL transmission is less than the threshold number of UL grants, is greater than the threshold time period; the number of retransmissions within the threshold time period is greater than the threshold number of retransmissions, the number of UL transmissions at MTPL is greater than the threshold number of UL transmissions at MTPL, and the time period after which the PDCP discard timer is activated is less than threshold time period after which the PDCP discard timer was supposed to be activated.

At step 902, the method includes preventing PDCP layer from pushing PDUs to NR RLC and NR MAC after predicting that the network 506 is likely to trigger NR UL leg switch. The embodiments herein allow the UE 501 to send BSR for NR RLC PDUs and NR MAC PDUs in the NR leg. The embodiments include sending the NR RLC PDUs and NR MAC PDUs using the UL grants that are available to the UE 501.

In an embodiment, after the UE 501 predicts UL leg switch, copies of the NR RLC PDUs and copies of NR MAC PDUs are created. The copies of NR RLC PDUs are sent to the LTE RLC leg and the copies of the NR MAC PDUs and send to the LTE MAC leg. The NR RLC PDUs and the NR MAC PDUs are marked once the NR RLC PDUs and the NR MAC PDUs have been transmitted from the LTE leg or the NR leg. The embodiments include receiving acknowledgements from the network 506, which allow the UE 501 to ascertain that the network 506 had received the PDUs. The embodiments include deleting the PDUs from the LTE leg, if the PDUs have been transmitted from the NR leg. The embodiments include deleting the PDUs from the NR leg if the PDUs have been transmitted from the LTE leg. This can prevent PDCP duplication.

At step 903, the method includes initiating recovery of data, which is dangling in the NR UL leg after the network 506 has triggered NR UL leg switch. Consider that the network 506 has triggered NR UL leg switch. The embodiments include sending the dangling PDUs from the NR RLC and NR MAC, to the LTE RLC and LTE MAC after NR UL leg switch is triggered. However, if the PDUs in the NR RLC and NR MAC are replicated in the LTE RLC and LTE MAC after the prediction of UL leg switch, there is no dangling PDUs.

When the NR UL leg switch triggered, the UE 501 is not able to obtain any UL grant on the NR leg. Instead, the UE 501 receives UL grant on the LTE leg. The embodiments allow the UE 501 to discard the dangling PDUs from the NR RLC and NR MAC. The dangling PDUs are retransmitted from the LTE RLC and LTE MAC after the dangling PDUs are discarded from the NR RLC and NR MAC, in order to avoid duplication of PDUs.

If the PDUs in the NR RLC and NR MAC are replicated in the LTE RLC and LTE MAC after the prediction of UL leg switch; and if there are PDUs in the NR leg after NR UL leg switch is triggered, then those PDUs in the NR UL leg will be discarded automatically. The copies of those PDUs in the LTE UL leg will be retransmitted.

The various actions in the flowchart 900 may be performed in the order presented, in a different order, or simultaneously. Further, in some embodiments, some actions listed in FIG. 9 may be omitted.

Figure 10:
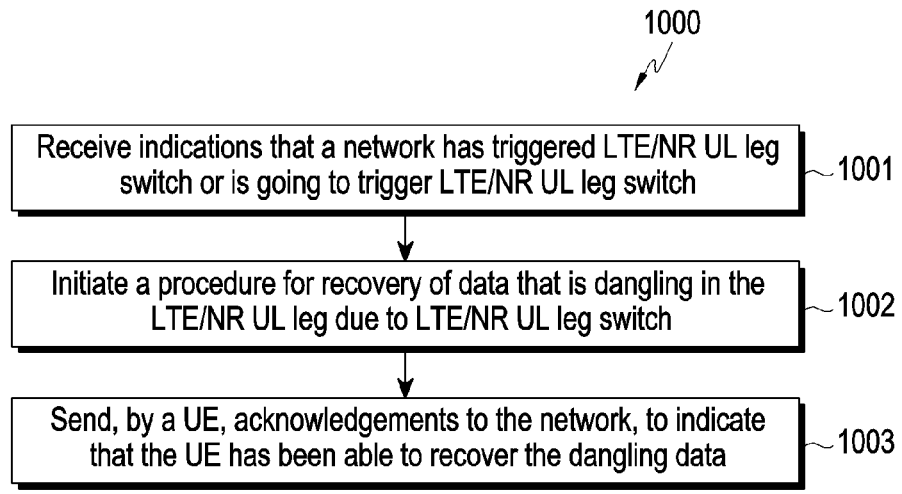
FIG. 10 is a flowchart depicting another method for enabling recovery of data that is dangling in the NR UL leg due to the triggering of UL leg switching by the network, according to embodiments as disclosed herein.

FIG. 10 is a flowchart 1000 depicting another method for enabling recovery of data that is dangling in LTE/NR UL leg due to the triggering of UL leg switching by the network 506, according to embodiments as disclosed herein. At step 1001, the method includes receiving, from the network 506, indications that the network 506 has triggered LTE/NR UL leg switch or is going to trigger LTE/NR UL leg switch. The network 506 can send the indications to the UE 501 using MAC CE sub-header. In an embodiment, the network 506 can use a reserved bit of the MAC CE sub-header to send the indication about UL leg switch triggering. The UE 501 can determine whether the network 506 is going to trigger LTE/NR UL leg switch on LTE/NR leg, on receiving the indication through the MAC CE sub-header. In an embodiment, the network 506 can use the $7^{th}$ bit of the MAC CE sub-header to indicate whether the UL leg switch triggering will happen on the LTE leg or the NR leg.

The network 506 can define the MAC CE sub-header with/without timing information. If the network 506 defines the MAC CE sub-header without timing information, the UE 501, on receiving the MAC CE sub-header, can determine that the network 506 has triggered LTE/NR UL leg switch. If the network 506 defines the MAC CE sub-header with the timing information, the UE 501, on receiving the MAC CE sub-header, can determine that the network 506 is going to trigger LTE/NR UL leg switch.

At step 1002, the method includes initiating a procedure for recovery of data that is dangling in the LTE/NR UL leg due to LTE/NR UL leg switch. The UE 501 can determine whether the UL leg switch has been triggered, by the network 506, on the LTE UL leg or the NR UL leg. Consider that UL leg switch has been triggered by the network 506 on the NR UL leg. If the received MAC CE sub-header does not include the timing information, the UE 501 discards all PDUs that are pending for transmission, on the NR UL leg.

If the received MAC CE sub-header includes the timing information, the UE 501 can prevent pushing of new PDUs from PDCP to the RLC of the UL leg in which UL leg switch has been triggered. The embodiments include initiating a timer, which expires when UL leg switch is triggered. The configuration of the timer is based on the timing information. The BSR is sent to the network 506 after calculation with information about data to be re-transmitted (MAC). The UE 501 considers HARQ retransmission data in HARQ buffer during BSR calculation. Consider that UL leg switch is triggered on the NR UL leg. On expiry of the timer, the PDUs on the NR UL leg can be discarded and the PDUs can be retransmitted on the LTE leg.

At step 1003, the method includes sending, by the UE 501, acknowledgements to the network 506 to indicate that the UE 501 has been able to recover the dangling data. Once the UE 501 is able to recover the dangled PDUs, post UL leg switch triggering, through the retransmission of the PDUs through the LTE leg (considering UL leg switch has triggered on the NR UL leg), the acknowledgement can be sent to the network 506. In an embodiment, the UE 501 can use a reserved bit of the MAC CE sub-header to send the acknowledgement.

The various actions in the flowchart 1000 may be performed in the order presented, in a different order, or simultaneously. Further, in some embodiments, some actions listed in FIG. 10 may be omitted.

The embodiments disclosed herein can be implemented through at least one software program running on at least one hardware device and performing network management functions to control the network elements. The network elements shown in FIG. 5 include blocks which can be at least one of a hardware device, or a combination of hardware device and software module.

The embodiments disclosed herein describe methods and systems for enabling recovery of data, by a UE with split bearer configuration, which is dangling in a LTE UL leg or a NR UL leg, due to UL leg switch triggered by a network, to which the UE is connected. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for handling data, dangling in a new radio (NR) leg of a split bearer, by a user equipment (UE), the method comprising:
predicting, by the UE, a time instance for an occurrence of an NR uplink (UL) leg switch;
sending a buffer status report (BSR) pertaining to protocol data units (PDUs) in radio link control (RLC) layer and media access control (MAC) layer in the NR leg based on the UE predicting the time instance for the occurrence of the NR UL leg switch; and
initiating recovery of dangling PDUs in the NR leg after the occurrence of the NR UL leg switch,
wherein the recovery includes sending the dangling PDUs to a long term evolution (LTE) leg of the split bearer, and
wherein the occurrence of NR UL leg switch is predicted based on at least one of:
a number of UL grants allocated to the UE, for transmission of UL data through the NR leg, is less than a threshold number of UL grants for more than a threshold time duration;
a number of UL retransmissions during the threshold time duration is greater than a threshold number of UL retransmissions;
an activation of packet data convergence protocol (PDCP) discard timer after a time period, wherein the time period is less than a threshold time period of activation after which the PDCP discard timer is activated; and
a number of UL transmissions at maximum transmit power limit (MTPL) is greater than a threshold number of UL transmissions at MTPL.

2. The method of claim 1, wherein the threshold time duration is a time period spanning a detection of degradation of the NR leg and the occurrence of the NR UL leg switch.

3. The method of claim 1, wherein the threshold number of UL grants, the threshold time duration, the threshold number of UL retransmissions, the threshold time period of activation of the PDCP discard timer, and the threshold number of UL transmissions at MTPL, is determined based on at least one of: UE transmitted power, modulation and coding scheme (MCS), reference signal received power (RSRP), beam RSRP, UL retransmissions, path loss, signal to noise ratio (SNR), PDCP discard timer, cell-identity (ID), location ID, and public land mobile network (PLMN) ID.

4. The method of claim 3, wherein values of the threshold number of UL grants, the threshold time duration, the threshold number of UL retransmissions, the threshold time period of activation of the PDCP discard timer, and the threshold number of UL transmissions at MTPL, are updated based on accuracy of the prediction of the NR UL leg switch.

5. The method of claim 1, wherein PDCP layer PDUs is prevented by the UE from being included in the BSR.

6. The method of claim 5, wherein the PDCP layer is caused by the UE to push the PDCP layer PDUs to the LTE leg based on the prediction of the occurrence of the NR UL leg switch.

7. The method of claim 1, wherein the method further comprises retransmitting the dangling PDUs from the LTE leg after the occurrence of the NR UL leg switch.

8. The method of claim 1, further comprising:
creating copies of the PDUs in the RLC layer and the MAC layer in the NR leg;
sending the copies of the PDUs to the LTE leg of the split bearer based on the prediction of the occurrence of the NR UL leg switch, prior to sending the BSR pertaining to the PDUs in the RLC layer and the MAC layer in the NR leg;
marking at least one PDU, amongst the PDUs, after transmission of the at least one PDU from one of the LTE leg and the NR leg; and
deleting the at least one PDU from one of:
the NR leg if the at least one PDU is transmitted from the LTE leg; and
the LTE leg if the at least one PDU is transmitted from the NR leg.

9. The method of claim 8, wherein the UE is configured to:
prevent PDCP layer PDUs from being included in the BSR; and
cause the PDCP layer PDUs to push the PDCP layer PDUs to the LTE leg based on the prediction of the occurrence of the NR UL leg switch.

10. A user equipment (UE) for handling data, dangling in a new radio (NR) leg of a split bearer, the UE comprising:
a communication interface; and
a processor coupled to the communication interface, wherein the processor is configured to:
predict a time instance for an occurrence of an NR uplink (UL) leg switch;
send a buffer status report (BSR) pertaining to protocol data units (PDUs) in radio link control (RLC) layer and media access control (MAC) layer in the NR leg based on the UE predicting the time instance for the occurrence of NR UL leg switch; and
initiate recovery of dangling PDUs in the NR leg after the occurrence of the NR UL leg switch, wherein the recovery includes sending the dangling PDUs to a long term evolution (LTE) leg of the split bearer, and
wherein the occurrence of NR UL leg switch is predicted based on at least one of:
a number of UL grants allocated to the UE, for transmission of UL data through the NR leg, is less than a threshold number of UL grants for more than a threshold time duration;
a number of UL retransmissions during the threshold time duration is greater than a threshold number of UL retransmissions;
an activation of packet data convergence protocol (PDCP) discard timer after a time period, wherein the time period is less than a threshold time period of activation after which the PDCP discard timer is activated; and
a number of UL transmissions at maximum transmit power limit (MTPL) is greater than a threshold number of UL transmissions at MTPL.

11. The UE of claim 10, wherein the threshold time duration is a time period spanning a detection of degradation of the NR leg and the occurrence of the NR UL leg switch.

12. The UE of claim 10, wherein the threshold number of UL grants, the threshold time duration, the threshold number of UL retransmissions, the threshold time period of activation of the PDCP discard timer, and the threshold number of UL transmissions at MTPL, is determined based on at least one of: UE transmitted power, modulation and coding scheme (MCS), reference signal received power (RSRP), beam RSRP, UL retransmissions, path loss, signal to noise ratio (SNR), PDCP discard timer, cell-identity (ID), location ID, and public land mobile network (PLMN) ID.

13. The UE of claim 12, wherein values of the threshold number of UL grants, the threshold time duration, the threshold number of UL retransmissions, the threshold time period of activation of the PDCP discard timer, and the threshold number of UL transmissions at MTPL, are updated based on accuracy of the prediction of the NR UL leg switch.

14. The UE of claim 10, wherein the processor is configured to prevent PDCP layer PDUs from being included in the BSR.

15. The UE of claim 14, wherein the processor is further configured to cause the PDCP layer to push the PDCP layer PDUs to the LTE leg based on the prediction of the occurrence of the NR UL leg switch.

16. The UE of claim 10, wherein the processor is further configured to retransmit the dangling PDUs from the LTE leg, after the occurrence of the NR UL leg switch.

17. The UE of claim 10, wherein the processor is further configured to:
create copies of the PDUs in the RLC layer and the MAC layer in the NR leg;
send the copies of the PDUs to the LTE leg of the split bearer, based on the prediction of the occurrence of the NR UL leg switch, prior to sending the BSR pertaining to the PDUs in the RLC layer and the MAC layer in the NR leg;
mark at least one PDU, amongst the PDUs, after transmission of the at least one PDU from one of the LTE leg and the NR leg; and
delete the at least one PDU from one of:
the NR leg if the at least one PDU is transmitted from the LTE leg; and
the LTE leg if the at least one PDU is transmitted from the NR leg.

18. The UE of claim 17, wherein the UE is configured to:
prevent PDCP layer PDUs from being included in the BSR; and
cause the PDCP layer PDUs to push the PDCP layer PDUs to the LTE leg based on the prediction of the occurrence of the NR UL leg switch.

* * * * *